United States Patent [19]
Sem et al.

[11] Patent Number: 6,037,864
[45] Date of Patent: Mar. 14, 2000

[54] METHOD FOR CONTINUOUSLY DETERMINING THE OIL CHANGE INTERVAL FOR AN INTERNAL COMBUSTION ENGINE

[75] Inventors: Thomas R. Sem, Minneapolis; Jay Lowell Hanson, Bloomington, both of Minn.

[73] Assignee: Thermo King Corporation, Minneapolis, Minn.

[21] Appl. No.: 09/257,084

[22] Filed: Feb. 24, 1999

[51] Int. Cl.[7] .................................................. B60Q 1/00
[52] U.S. Cl. ........................................ 340/457.4; 340/679
[58] Field of Search .............................. 340/457.4, 457, 340/679

[56] References Cited

U.S. PATENT DOCUMENTS

| | | |
|---|---|---|
| 4,506,337 | 3/1985 | Yasuhara . |
| 4,533,900 | 8/1985 | Mulberger et al. . |
| 4,706,193 | 11/1987 | Imajo et al. . |
| 4,742,476 | 5/1988 | Schwartz et al. . |
| 4,796,204 | 1/1989 | Inoue . |
| 4,847,768 | 7/1989 | Schwartz et al. . |
| 4,862,393 | 8/1989 | Reid et al. . |
| 4,970,492 | 11/1990 | King . |
| 5,060,156 | 10/1991 | Vajgart et al. . |
| 5,382,942 | 1/1995 | Raffa et al. . |
| 5,530,647 | 6/1996 | Sem et al. . |
| 5,559,494 | 9/1996 | Thompson . |
| 5,592,395 | 1/1997 | Braun et al. . |
| 5,633,796 | 5/1997 | Cullen et al. . |
| 5,642,284 | 6/1997 | Parupalli et al. . |
| 5,750,887 | 5/1998 | Schricker . |

*Primary Examiner*—Jeffery A. Hofsass
*Assistant Examiner*—Daniel Previl
*Attorney, Agent, or Firm*—Michael M. Gnibus

[57] ABSTRACT

A method for determining the oil change interval for an internal combustion engine for driving a refrigerant compressor. The method includes the steps of sensing if the engine is being operated at high speed; incrementing the high speed counter during hours of high speed operation; sensing if the engine has been stopped; incrementing the counter for number of stops during the oil change interval; calculating the new oil change interval based on the current values in the high speed counter and the number of stops counter; and comparing the calculated new oil interval with the number of hours of service, and if the number of hours of service exceeds the new oil change interval, displaying a message indicating an oil change is needed.

9 Claims, 4 Drawing Sheets

METHOD FOR CONTINUOUSLY DETERMINING THE OIL CHANGE INTERVAL FOR AN INTERNAL COMBUSTION ENGINE

BACKGROUND OF THE INVENTION

The invention relates to a method for continuously determining the oil change interval for an internal combustion engine, and more specifically the invention relates to a method for continuously determining the oil change interval for an internal combustion engine where the oil change interval is based primarily on the number of engine starts and stops and time spent operating the engine at high speed.

A conventional mobile temperature control system includes a prime mover which may be an internal combustion engine such as a diesel engine. Such prime movers commonly drive refrigerant compressors which in turn pump refrigerant through the temperature control system to achieve and maintain the required temperature in a conditioned space.

It is well known that the oil lubricating the component parts of the internal combustion engines has a finite useful life and as a result, the oil must be changed before it becomes unsuitable to lubricate the engine components. If the oil is not changed before it becomes unsuitable for lubrication of the engine's component parts, the engine's useful life could be negatively affected. Conversely, changing the oil too soon before it becomes unsuitable for lubrication would result in a waste of oil. Therefore, methods have been developed to more precisely determine when lubricating oil needs to be changed.

The oil change interval is often affected by engine rotational speed which causes oil oxidation. It can be difficult to precisely determine the required oil change interval based solely on engine speed because the engine speed is typically variable during operation of the temperature control system and moreover, it is difficult to predict the engine speed because the engine speed varies according to a plurality of factors including: the characteristics of the load in the cargo space being conditioned by the temperature control system, the set point temperature of the conditioned space, the ambient temperature, and the frequency of the openings of the conditioned space access door during cargo transfers.

Prior art inventions have addressed determining the required oil change interval based on engine speed. For example, U.S. Pat. No. 5,530,647 issued assigned to Thermo King Corporation discloses a method for dynamically determining the oil change interval for an internal combustion engine by accumulating operating time for an internal combustion engine operating at high and low engine speeds; and after summing the accumulated operating information, determining if the engine has reached a predetermined operating level. If the engine has reached the predetermined operating level, the operator is informed that the oil needs to be changed.

Other prior art inventions relate to systems and methods for determining the oil change interval based on the level of undissolved particulate matter in the oil. U.S. Pat. No. 4,506,337 issued assigned to Nissan Motor Company; and U.S. Pat. No. 5,750,887 issued assigned to Caterpillar Incorporated disclose methods for determining when engine oil needs to be changed by determining if the amount of undisolvable soot or particulate matter in the oil exceeds a predetermined level.

Known prior art temperature control systems and methods do not calculate the oil change interval based on the number of engine starts and stops. Engine starts and stops increase the oil carbon content through "carbon loading". During starting and stopping of the engine increased amounts of carbon are introduced in the engine oil. Carbon-containing blow by combustion gas that leaks past the rings to the engine block makes contact with oil, and mixes with the oil, and in this way, carbon loads the oil. Increased carbon content in the oil shortens the requisite oil change interval. It would be beneficial to calculate the oil change interval based on starting and stopping the engine to consider the effects of carbon loading on the oil change interval.

The foregoing illustrates limitations known to exist in present devices and methods. Thus, it is apparent that it would be advantageous to provide an alternative method directed to overcoming one or more of the limitations set forth above. Accordingly, a suitable alternative method is provided including features more fully disclosed hereinafter.

SUMMARY OF THE INVENTION

In one aspect of the present invention, this is accomplished by providing a method for determining the oil change interval for an internal combustion engine based primarily on the number of times the engine is started or stopped. The method includes the steps of sensing if the engine is being operated at high speed; incrementing the high speed counter during hours of high speed operation; sensing if the engine has been started or stopped; incrementing the counter for the number of engine starts and stops during the oil change interval; calculating the new oil change interval based on the current values in the high speed counter and the start/stop counter; and comparing the calculated new oil interval with the number of hours of service, and if the number of hours of service exceeds the new oil change interval, displaying a message indicating an oil change is needed.

The foregoing and other aspects will become apparent from the following detailed description of the invention when considered in conjunction with the accompanying drawing figures.

DESCRIPTION OF THE DRAWING FIGURES

FIG. 1 is a part schematic representation part box diagram of a transport refrigeration system having an internal combustion engine which has variable oil change intervals determined in accordance with the method of the present invention;

FIGS. 2a and 2b taken together represent a flow diagram of a program for determining the oil change interval for an internal combustion engine based on operating time at high engine speed and the number of engine starts or stops;

FIG. 3 is a flow diagram representing the program for sensing that an oil change has been made and initializing controller counters and clearing the alarm display.

DESCRIPTION OF THE PREFERRED EMBODIMENT

Figure 1:
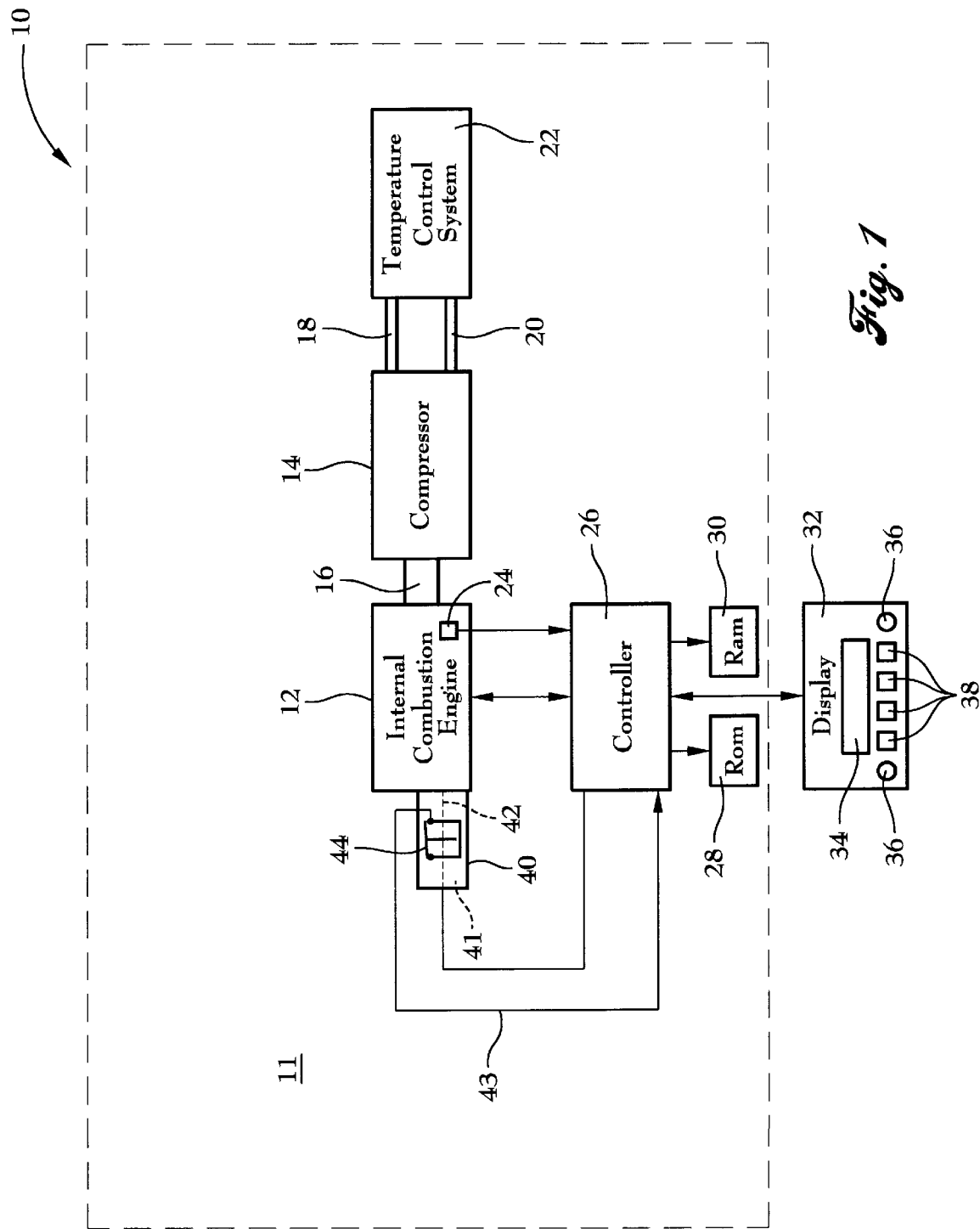

Turning now to the drawings wherein like parts are referred to by the same number throughout the several views, and particularly FIG. 1, there is shown a partially block, partially schematic diagram of mobile temperature control unit, generally identified at 10. The mobile temperature control unit maintains the temperature of the air or other ambient fluid in a closed conditioned space 11 which may be a truck, trailer, container or the like.

Mobile temperature control unit 10 includes components common to such well known temperature control units. Unit 10 includes refrigerant compressor 12 driven by an internal combustion engine 14, which may be a diesel engine for example. The engine drives the refrigerant compressor through drive coupling 16 in a conventional manner, well known to one skilled in the art at a low speed of 1450 RPM, and at a high speed of 2200 RPM. The refrigerant compressor may be a reciprocating or scroll type compressor.

An oil level switch 44 is arranged to be responsive to a level of lubricating oil 41 disposed in oil sump or crankcase 40 of engine 12. Oil level switch 44 is electrically connected to controller 26 by line 43 that extends between the controller and an electrical contact of an oil level switch. The switch contact is open when the oil level 42 is in an acceptable range. The switch is closed when the oil level is not in the predetermined acceptable range. Thus oil level switch 44 provides an input voltage to the controller 26 when the oil level drops below an acceptable level, such as during an oil change.

A conventional speed sensor 24 senses the operating speed of the engine and provides the actual engine speed to microprocessor based controller 26. An hour meter measures the elapsed time of engine operation between oil changes. The hour meter is made integral with the microprocessor based controller in a conventional manner and accumulates engine operating time between oil changes. The sensed elapsed time of engine operation may be referred to hereinafter as "HIS", an abbreviation for hours in service. The hour meter is located on the engine in a conventional manner to be operable to sense engine operation.

Temperature control system 22 is flow connected to the refrigerant compressor 14 by compressor suction and discharge lines 18 and 20 respectively. The temperature control system collectively represented at 22 includes conventional well known components (not shown) including, but not limited to a condenser for removing heat from the refrigerant, an evaporator for removing heat from the air in the conditioned space, an expansion valve for metering the flow of refrigerant to the evaporator coil, and refrigerant flow lines flow connecting the refrigerant compressor, condenser, expansion valve, and evaporator.

Operation of mobile temperature control unit 10 is monitored and controlled by the microprocessor based controller 26. Controller 26 is a conventional microprocessor based controller and includes a read-only-memory (ROM) 28 which stores application programs and the like, and a random-access-memory (RAM) 30 which stores counter values, variables, new oil change intervals and the like. Programs 100 and 200 illustrated in FIGS. 2a, 2b, and 3 is stored in ROM 28.

Unit 10 also includes an interactive display 32. The interactive display includes an alpha numeric readout 34 such as for displaying selected set point temperature, alarm codes, and the like, push buttons 38 for interactive communication by authorized personnel with controller 26, and visual indicators and alarms in the form of indicator lights 36. The display is electrically connected to the controller in signal receiving and signal transmitting relation with the controller 26.

Operation of the method of the present invention for determining the oil change interval will now be described.

Figure 2A:
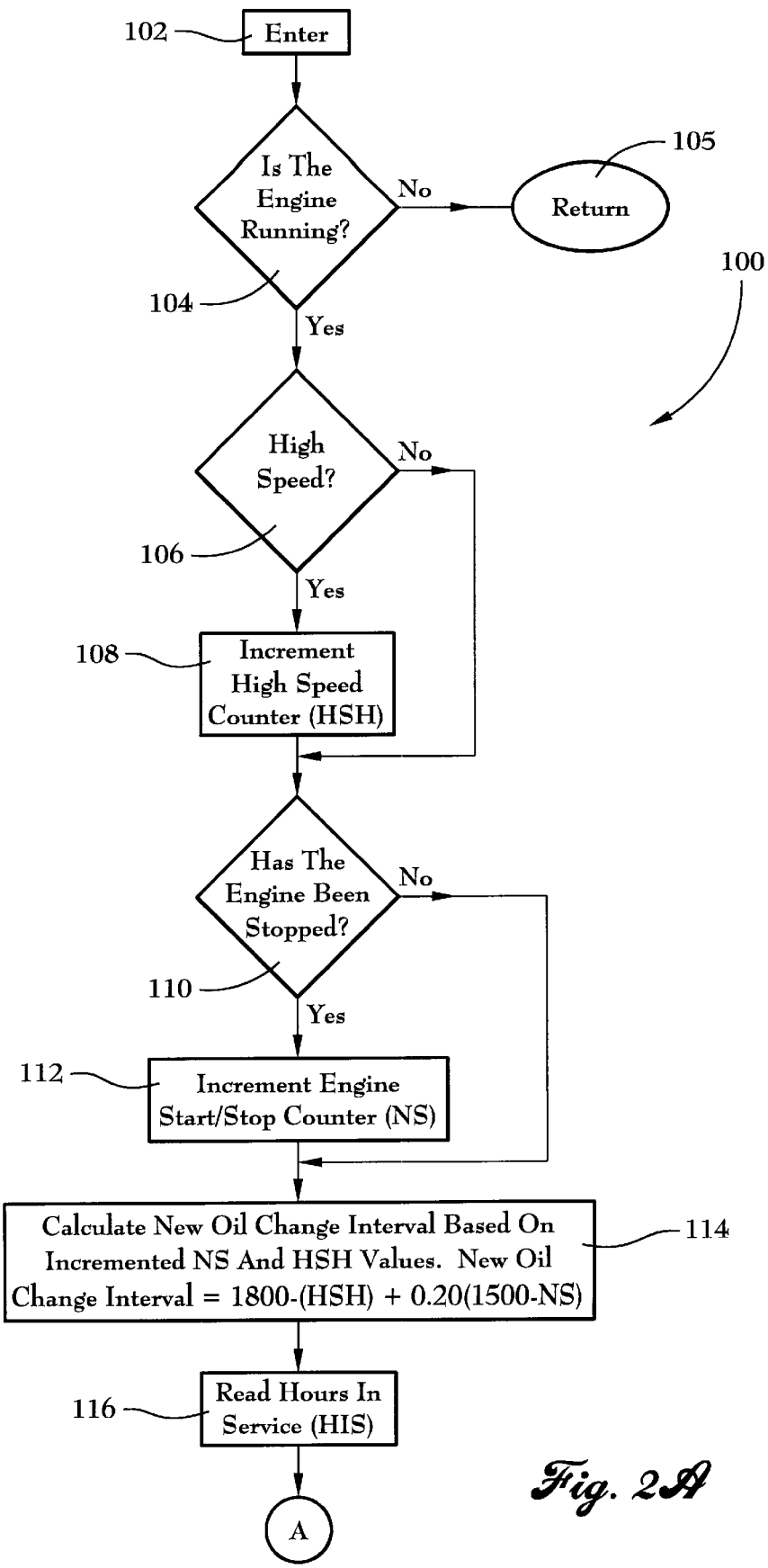
Figure 2B:
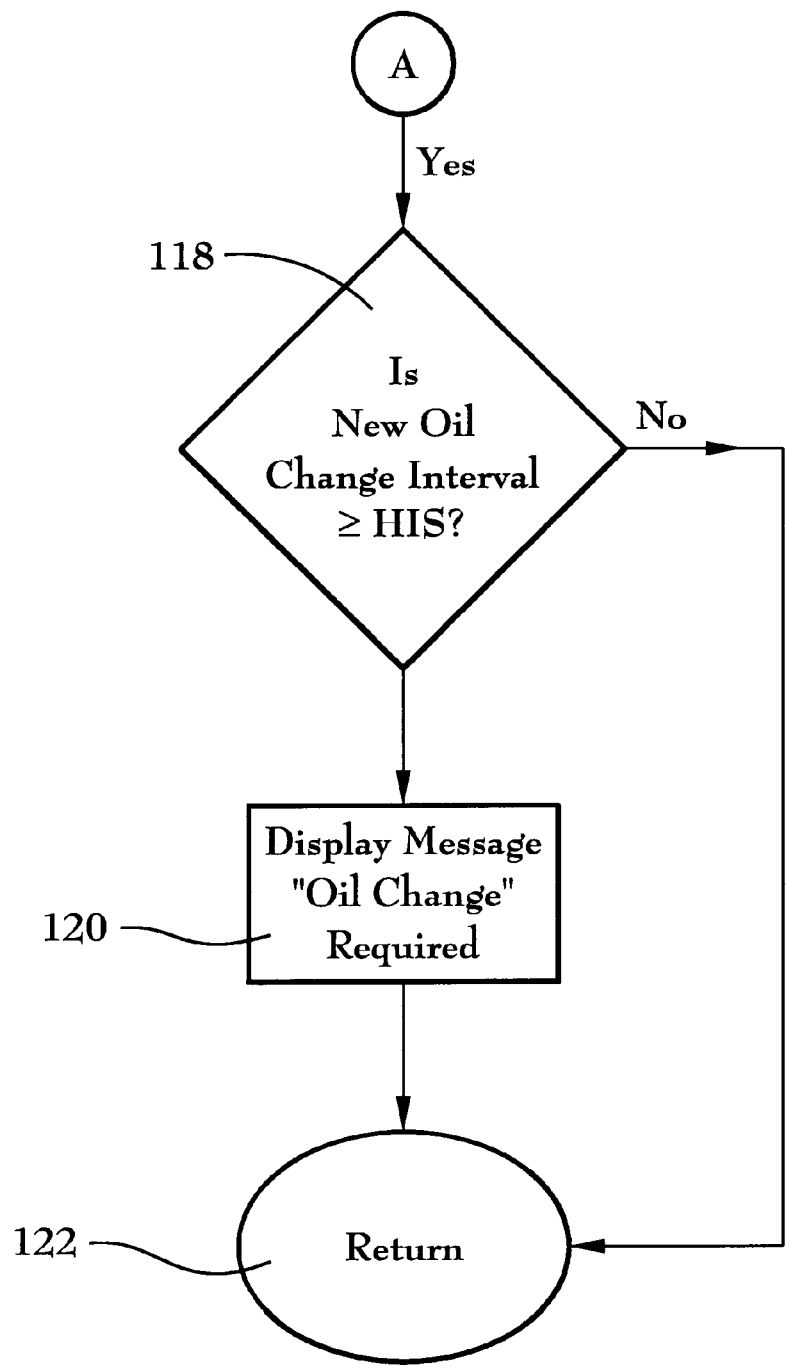
Figure 3:
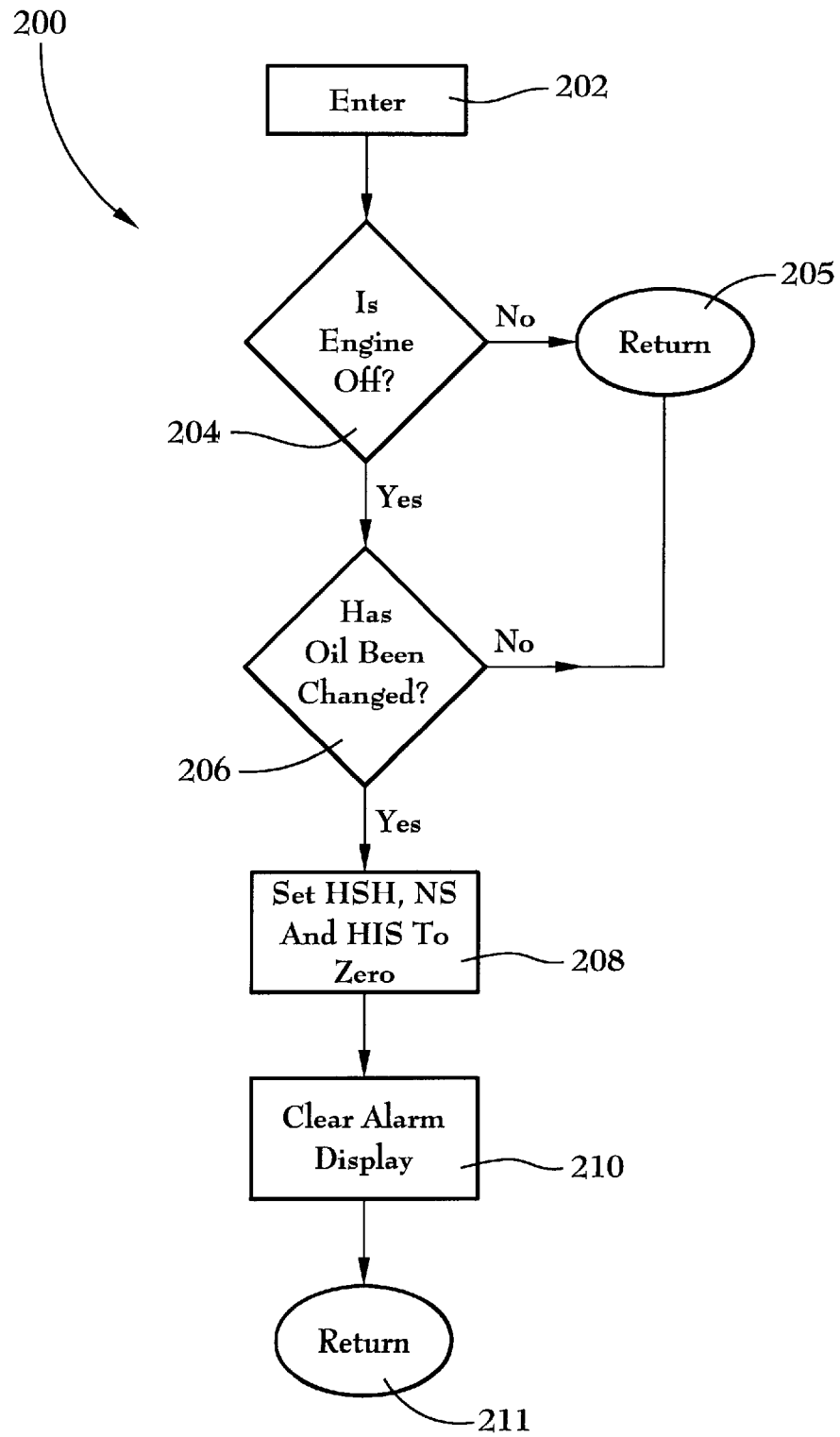

FIGS. 2a and 2b taken together represent program 100 for continuously determining the oil change interval for internal combustion engine 12. The program 100 is stored in ROM 28 and the program 100 is periodically entered at step 102 and step 104 determines if engine 12 is running. For example, in this step, the controller may determine if the engine is running by determining if an engine fuel solenoid is energized. If the engine is not running the program exits at return step 105. If the engine is running, additional program steps are executed. If the engine is not running, no additional program steps are executed.

When the engine is running, the microprocessor hour meter is updating the value of hours in service (HIS) in RAM 30.

In step 106 the program determines if the engine is operating at high speed (2200 RPM). If the engine is operating at high speed, the high speed counter (HSH) tabulating the hours of engine operation at high speed, is incremented in step 108. If in step 106 the engine is deemed to be running at low speed, the program jumps downstream of step 108 to step 110.

In step 110, the routine determines if the controller has started or stopped the engine since the routine step was last executed. If the engine was started or stopped the engine start/stop counter (NS) is incremented for each start or stop.

We have found that on the average, a dual speed transport refrigeration unit will operate about 20% of the time at high speed and the remaining time, about 80% at low speed. For diesel engines used to drive refrigerant compressors, in transport temperature control units, the engine oil should be changed after 1500 operating hours if the engine runs at the average of 20% high speed and 80% of low speed, 300 hours at high speed and 1200 hours at low speed. The 1500 hour benchmark is for naturally occurring engine oil.

The formula we have developed for determining the oil change interval for an engine that uses standard oil based on engine speed and the number of starts or stops reads as follows:

$$1800 - (HSH) + 0.20(1500 - NS) = \text{oil change interval for a unit}$$
$$\text{running 20\% high speed 80\% low}$$
$$\text{Speed for 1500 hours}$$

Additionally, we have found that for an engine using a mineral or synthetic oil, the engine may run for longer periods of time between oil changes. In these instances the maximum running time is 3,000 hours 20% at high speed and 80% at low speed. The equation for determining oil change interval operation with a synthetic or mineral oil based on engine speed and operating time at high speed is as follows:

$$3600 - (HSH) + 0.20(3000 - NS) = \text{oil change interval for a unit}$$
$$\text{running 20\% high speed 80\%}$$
$$\text{low speed for 3000 hours}$$

For example, for naturally occurring oil, if the engine has been operated at high speed for 300 hours and the engine has been stopped 20 times the oil change interval would be:

$$1800-300+0.20(1500-20)=1796 \text{ hours}$$

If the engine is then operated for ten more hours at high speed, and stopped once more, the new oil change interval would be reduced as follows:

$$1800-310+0.20(1500-21)=1785.8 \text{ hours}$$

In step 114, the new oil change interval is calculated using the equation that corresponds to the type of engine lubricant being used. In both equations the updated value of high speed hours of operation (HSH) and number of starts and stops (NS) are inserted into the equation to calculate the new oil change interval. Depending on the changes in engine operating conditions that occur over time, the oil change interval may stay substantially constant or may decrease incrementally.

In step 116 the HIS value is obtained from the hour meter and then in step 118 the new oil change interval is compared to the current reading in the engine hour meter obtained in step 116. If the new oil change interval is greater than or equal to the number of hours the engine has been in service since the last oil change, as determined in step 118, an alarm is displayed on display 32 that an oil change is required. If the hour meter reading exceeds the new oil change interval, no message is sent to the unit operator. The alarm may be displayed on alphanumeric screen 34 or indicators 36 may be illuminated. The alarm light will remain illuminated and the message will remain on the screen until the oil is changed.

Program 200 in FIG. 3 represents the logic for determining if the engine oil has been changed and for resetting the counters if the oil has been changed. After entering the program in step 202, the routine confirms that the engine is off in step 204 by sensing whether a fuel solenoid is open or in another conventional manner. Once it is determined that the engine is not running in step 204, the routine executes step 206 to determine if the oil has been changed. If after the engine is stopped the engine is drained from sump 40, the oil level switch is closed thereby providing a voltage to the controller. After the new oil is added to the crankcase, the oil level switch will open. This change in voltage to the controller will cause the controller logic to sense that the engine oil has been changed.

In steps 208 and 210, after if has been determined that the engine oil was changed, the controller resets the start/stop and high speed counters NS and HSH, and the microprocessor engine hour meter. Additionally in step 210 the display alphanumeric screen 34, and/or visual alarm 36 are returned to their prealarm conditions.

The oil change interval constantly changes during unit operation as a result of variations in the operating parameters of the internal combustion engine. For example, extensive high speed operation or frequent engine starts and stops will decrease the oil change interval. The method of the present invention determines the new oil change interval based on high speed operation and the number of engine starts and stops. The starting and stopping induces carbon loading of the oil and the high speed affects oil oxidation. Carbon loading and oxidation are two occurrences that hasten the degradation of the oil. By the present method the oil change interval may be determined more precisely than with prior art methods.

While we have illustrated and described a preferred embodiment of our invention, it is understood that this is capable of modification, and we therefore do not wish to be limited to the precise details set forth, but desire to avail ourselves of such changes and alterations as fall within the purview of the following claims.

Having described the invention, what we claim as our invention is:

1. A method for determining the oil change interval for an internal combustion engine where the internal combustion engine includes means for sensing the engine operating speed, means for sensing if the engine has been started or stopped, and engine processor means for calculating new oil change intervals; the method comprising the steps of:
   a) sensing if the engine is being operated at high speed;
   b) sensing if the engine has been stopped or started;
   c) calculating a new oil change interval based on the values of time of operation at high speed and the number of engine stops; and
   d) determining if an oil change is required by comparing the calculated new oil interval with the number of hours of engine service since the last oil change.

2. The method as claimed in claim 1 wherein the processor includes a high speed counter, the method comprising the additional step of incrementing the high speed counter for time of engine operation at high speed.

3. The method as claimed in claim 1 wherein the processor includes an engine start/stop counter, the method comprising the additional step of incrementing the engine start/stop counter for counting the number of engine starts and stops.

4. The method as claimed in claim 1 wherein the processor includes means for displaying a message, the method comprising the additional step of displaying a controller message indicating an oil change is needed if the value of hours of engine service exceeds the new oil change interval.

5. The method as claimed in claim 1 wherein the new oil change interval is determined by an algorithm based on operating conditions comprised of running the engine at high speed 20% of the operating time and at low speed 80% of the operating time.

6. The method as claimed in claim 5 wherein the algorithm for calculating the new oil change interval is equal to the sum of: a first factor equal to (total time of engine operation at high speed subtracted from 3600) and a second factor equal to the product of (the value of the number of starts and stops subtracted from 3000) multiplied by 0.20.

7. The method as claimed in claim 5 wherein the algorithm for calculating the new oil change interval is equal to the sum of: a first factor equal to (total time of engine operation at high speed subtracted from 1800) and a second factor equal to the product of (the value of the number of starts and stops subtracted from 1500) multiplied by 0.20.

8. The method as claimed in claim 1 wherein the processor includes means for counting hours of engine service between oil changes, the method comprising the additional step of reading the hours of engine service between oil changes.

9. A method for determining the oil change interval for an internal combustion engine for driving a refrigerant compressor which supplies refrigerant to a temperature control system, where the internal combustion engine includes means for sensing the engine operating speed, means for sensing if the engine has been started or stopped, and engine processor means for calculating new oil change intervals; the method comprising the steps of:
   a) sensing if the engine is being operated at high speed;
   b) sensing if the engine has been stopped or started;
   c) calculating a new oil change interval based on the values of time of operation at high speed and the number of engine stops; and
   d) determining if an oil change is required by comparing the calculated new oil interval with the number of hours of engine service since the last oil change.

* * * * *